United States Patent [19]

Kimura et al.

[11] Patent Number: 4,531,484
[45] Date of Patent: Jul. 30, 1985

[54] VIBRATION RESPONSIVE MOUNTING ARRANGEMENT FOR AUTOMOTIVE ENGINE OR THE LIKE

[75] Inventors: Akira Kimura, Zushi; Masao Ishihama, Yokosuka; Toshiro Abe, Yokohama; Kiyoshi Shimada; Shinichi Matsui, both of Yokosuka, all of Japan

[73] Assignee: Nissan Motor Co., Ltd., Yokohama, Japan

[21] Appl. No.: 438,756

[22] Filed: Nov. 3, 1982

[30] Foreign Application Priority Data

Nov. 20, 1981 [JP] Japan .................................. 56-187507
Nov. 20, 1981 [JP] Japan .................................. 56-187508

[51] Int. Cl.³ .......................................... F02B 75/06
[52] U.S. Cl. ............................. 123/192 R; 123/198 E; 267/35; 248/550
[58] Field of Search ........... 123/192 R, 192 B, 198 E; 248/550; 267/35; 180/299, 300, 312, 902, 291; 280/707, 714; 188/298, 299

[56] References Cited

U.S. PATENT DOCUMENTS

| 1,738,532 | 12/1929 | Harbour | 123/192 R |
| 3,587,764 | 6/1971 | Bowles | 180/291 |
| 3,606,233 | 9/1971 | Scharton et al. | 248/358 |
| 3,610,611 | 10/1971 | Elliott et al. | 280/707 |
| 3,701,499 | 10/1972 | Schubert et al. | 248/550 |
| 4,076,275 | 2/1978 | Hiruma | 280/707 |
| 4,154,206 | 5/1979 | Le Salver et al. | 123/192 B |
| 4,212,484 | 7/1980 | Fujii | 280/707 |
| 4,270,771 | 6/1981 | Fujii | 280/707 |
| 4,373,744 | 2/1983 | Glaze | 280/707 |
| 4,401,310 | 8/1983 | Ishikawa et al. | 280/707 |
| 4,402,527 | 9/1983 | Kakehi et al. | 280/707 |

FOREIGN PATENT DOCUMENTS

| 56-43026 | 4/1981 | Japan . | |
| 56-50814 | 5/1981 | Japan . | |
| 82633 | 7/1981 | Japan | 180/291 |
| 57-422 | 1/1982 | Japan . | |

OTHER PUBLICATIONS

Kimura et al., U.S. Ser. No. 454,546 filed Dec. 30, 1982, entitled "Vibration Responsive Mounting Arrangement . . .".

Primary Examiner—Ira S. Lazarus
Assistant Examiner—R. S. Bailey
Attorney, Agent, or Firm—Schwartz, Jeffery, Schwaab, Mack, Blumenthal & Evans

[57] ABSTRACT

The expansion/contraction timing of an actuator chamber is varied in accordance with the sensed engine vibration in a manner as to compensate for the frequency dependent change in pressure transmission characteristics between the chamber of the actuator and the chamber of an engine suspension insulator. This is done by sensing the engine vibration frequency or a parameter which varies in accordance with same (e.g. RPM) and suitably delaying a solenoid or similar electric motor energization signal in accordance with the frequency of the vibration.

13 Claims, 9 Drawing Figures

VIBRATION RESPONSIVE MOUNTING ARRANGEMENT FOR AUTOMOTIVE ENGINE OR THE LIKE

BACKGROUND OF THE INVENTION

1. Field of the Invention

The present invention relates generally to an engine mounting arrangement and more specifically to an engine mounting arrangement which includes an elastomeric insulator including a chamber which may be hydraulically pressurized/depressurized in synchronism with the vibration of the engine despite the change in pressure transmission characteristics between the chambers which occur with engine change of engine vibration.

2. Description of the Prior Art

In a previously proposed dynamic spring constant reducing arrangement shown in FIG. 1 of the drawings, an elastomeric mounting insulator 1 having a hydraulic chamber 2 defined therein, is operatively interposed between an automotive engine 3 and the chassis 4. The hydraulic chamber 2 is fluidly communicated with an actuator arrangement 5 having a variable volume chamber 6 which is contracted and expanded in response to the rotation of a cam 7. The cam 7 in this instance is operatively connected to the crankshaft of the engine (not shown) so as to rotate in synchronism therewith. The operation of this arrangement is such that as the engine 3 vibrates in a manner to compress the insulator 1 and thus reduce the volume of the chamber 2 defined therein, the cam 7 is adapted to induce an expansion of the chamber 6 so as to relieve the pressure tending to develop in the chamber 2, and subsequently, as the engine moves away from the chassis 4 and the chamber 2 tends to expand, the cam 7 rotates to a position wherein the chamber 6 is contracted to maintain the pressure in the chamber 2 and prevent same from falling due to the expansion thereof.

With this type of arrangement the pressure transmitted from one chamber to the other assumes the form of a pressure wave which moves with a speed variable with the type of fluid involved, the dimensions of the conduit 8 interconnecting the chambers and the frequency with which the chambers are contracted and expanded (viz., engine vibration frequency), and thus requires a finite time to be transmitted from one chamber to the other. For example, in the case that the fluid used is water, through which a pressure wave propagates at 1800 m/sec., the insulator is used to support a four cylinder in line internal combustion engine and the chambers are interconnected by a conduit one meter long, when the engine is running at 1200 RPM and produces a vibration of 40 Hz the pressure wave produced has a wave length of 45 meters. Thus, because the wave must traverse a given distance (viz., the length of the interconnecting conduit) a phase lag of 8 degrees occurs between the chambers. However, when the speed of the engine is raised to 2400 RPM and vibrates at 80 Hz for example, the wave length of the pressure wave shortens to 22.5 m and the phase lag increases to 16 degrees.

Thus, with the above arrangement, it has been impossible to, over a wide range of engine operating conditions, achieve the desired suspension characteristics as a result of the change in time required for the pressure generated in one chamber to reach the other with change of vibration frequency and the inevitable asynchronization of the pressures therebetween.

A full and detailed disclosure of the above disclosed arrangement may be found in U.S. Pat. No. 4,154,206 issued on May 15, 1979 in the name of LeSalver et al.

SUMMARY OF THE INVENTION

It is an object of the present invention to provide an arrangement wherein the desired synchronization between the chamber of suspension insulator and the chamber of an actuator is maintained over a wide range of operating conditions.

The present invention therefore features an arrangement wherein the rate of expansion/contraction of an actuator chamber is varied in accordance with the sensed engine vibration in a manner as to compensate for the frequency dependent change in pressure transmission characteristics between the chamber of the actuator and the chamber of an engine suspension insulator. This is done by either directly sensing the engine vibration frequency or by sensing a parameter which varies in accordance with same (e.g. RPM) and suitably delaying a solenoid energization signal in accordance with the frequency of the vibration. This compensates for the increased time require for the pressure wave to be transmitted from one chamber to the other which occurs with increasing frequency and allows for the pressure in the chamber defined in the insulator to remain essentially constant over a wide RPM range and thus maintain the dynamic spring constant thereof at a desirably low valve and accordingly increase the vibration damping capacity of the unit.

More specifically, the invention takes the form of an arrangement for mounting a vibrating body on a stationary base member comprising an insulator operatively interposed between the body and the base for supporting the body on the base, means defining a variable volume chamber in the insulator, means for generating a fluid pressure, means for producing a signal indicative of engine vibration, a control circuit operatively interconnecting the signal producing means and the fluid pressure generating means which control circuit outputs a pulse train signal for driving the fluid pressure generating means, the control circuit including means for delaying the pulse train in accordance with the frequency of the signal from the signal producing means in a manner as to compensate for the change time require for pressure to be transmitted between the fluid pressure generating means and the variable volume chamber which occurs with change in the vibration frequency of the body.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
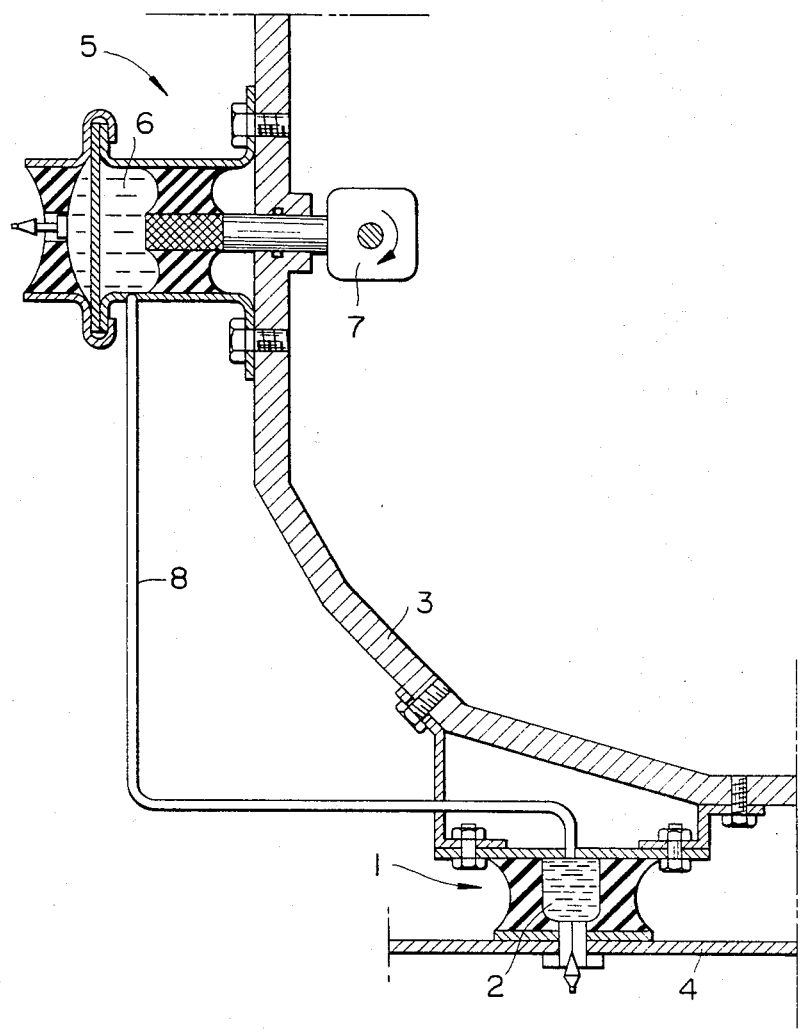
FIG. 1 is a sectional view of the prior arrangement discussed in the opening paragraphs of the invention.
Figure 2:
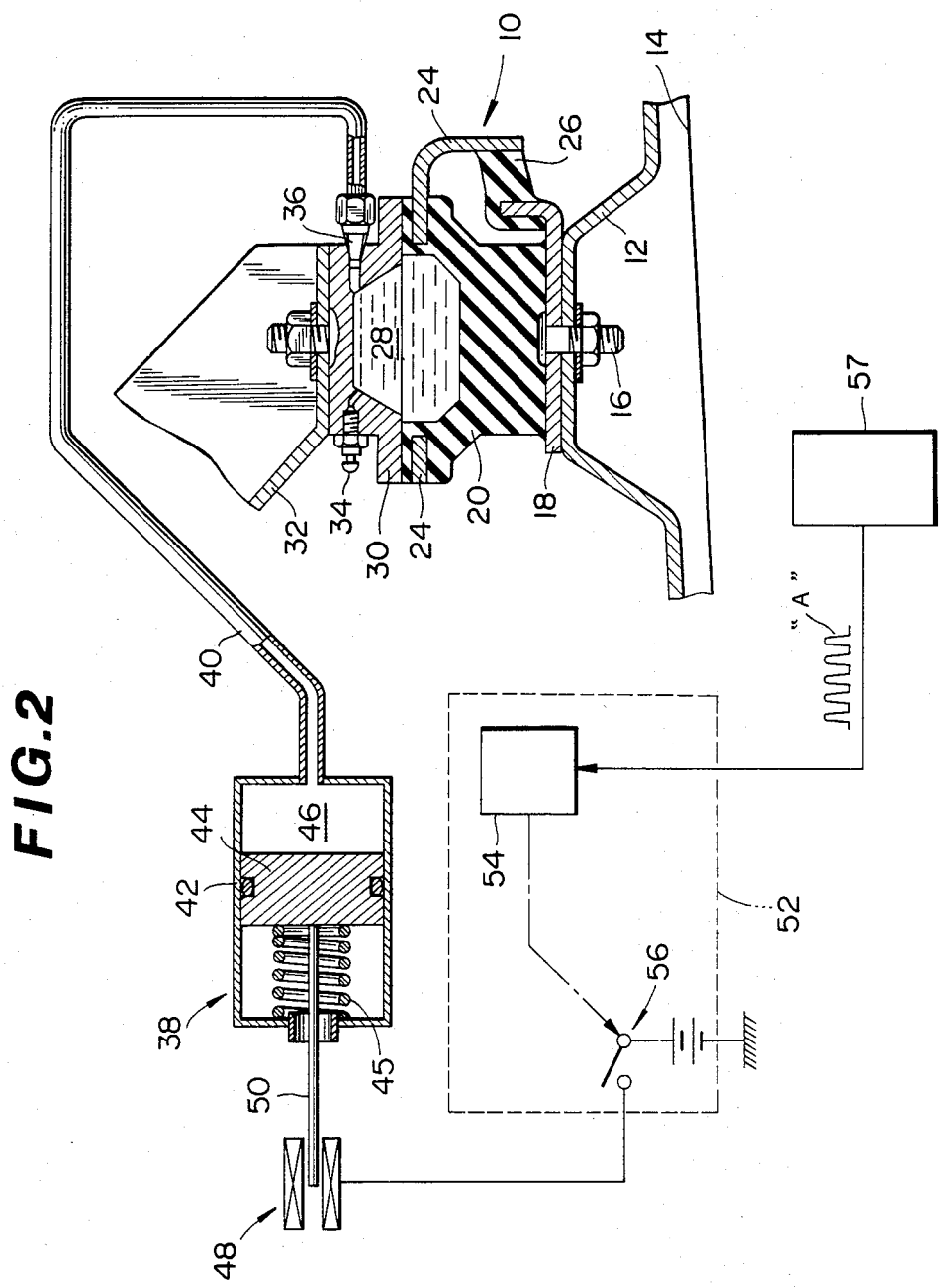
FIG. 2 is a sectional view of a first embodiment of the present invention.

Turning now to FIG. 2 a first embodiment of the present invention is shown. In this arrangement, a mounting insulator generally denoted by the numeral 10 is secured to a mounting bracket 12 welded or otherwise fixedly secured to a vehicle chassis 14 by a bolt 16. The insulator in this case comprises a base mounting bracket 18 on which a main elastomeric member 20 is vulcanized (or otherwise permanently attached). A retaining bracket 24 is disposed about the upper portion of the main elastomeric member 20 and interconnected with the base mounting bracket 18 through a secondary elastomeric member 26. A chamber 28 is defined within the insulator partly by a recess formed in the main elastomeric member 20 and partly by a recess defined in a metallic cap 30 fixedly secured via vulcanizing or the like to the top of the elastomeric member 22. The cap 30 is in turn bolted to a mounting strut 32 extending from the engine proper and formed with an air bleed 34 and a coupling 36.

An actuator generally denoted by the numeral 38 is fluidly interconnected with the insulator 10 via a conduit 40 having a known length. The actuator 38 in the first embodiment takes the form of a cylinder 42 in which a piston 44 is reciprocatively disposed. The piston 44 is biased in a direction to reduce the volume of the variable volume chamber 46 it defines in the cylinder 42 by a spring 45 and interconnected with a suitable solenoid arrangement 48 via a connecting rod 50.

In this embodiment the solenoid 48 is energized by a control circuit 52 including a phase compensating circuit 54 and a power amplifier 56. As shown the control circuit 52 receives an input signal "A" the frequency of which varies with the rotational speed of the engine. This signal is derived from a suitable source 57 such as a crank angle sensor or an ignition distributor by way of example.

Figure 3:
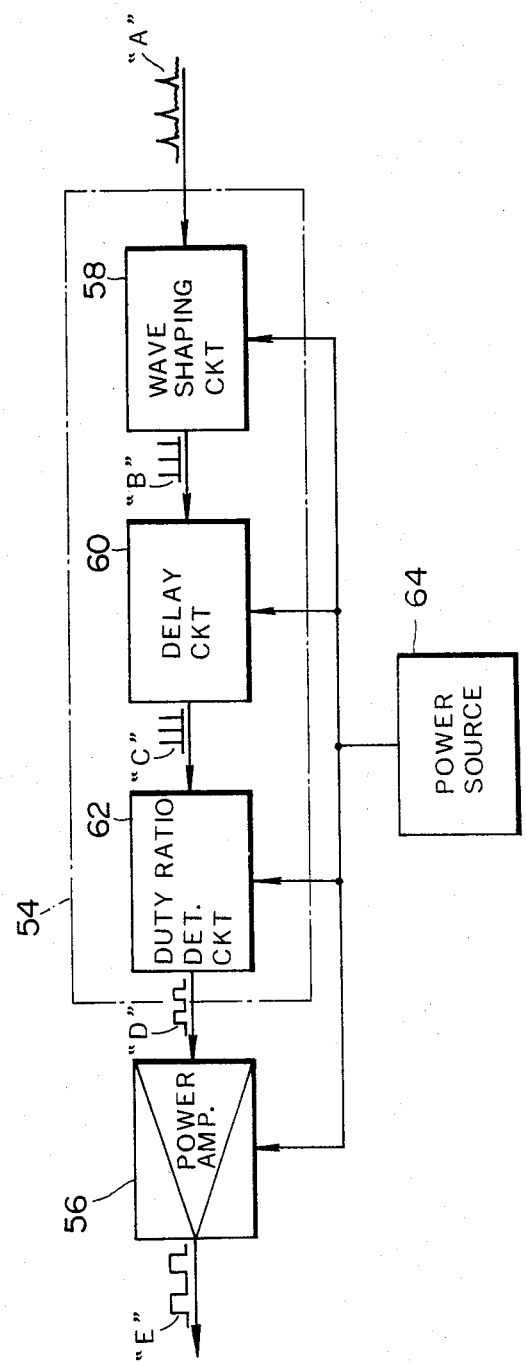
FIG. 3 is a block diagram of a circuit used in the embodiment shown in FIG. 2.
Figure 4:
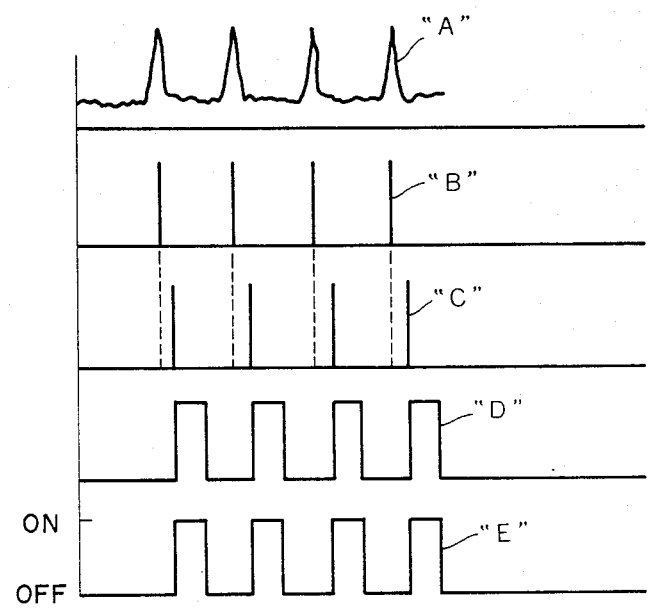
FIG. 4 is a timing chart showing the signal produced in the circuit arrangement shown in FIG. 3.

FIG. 3 shows the control circuit 52 in block diagram form. As shown the phase compensating circuit 54 includes a wave shaping circuit 58 which receives the input signal "A" which processes same and produces an output in the form of signal "B" (see FIG. 4) which is then fed to a delay circuit 60. This circuit is adapted to delay the signal in accordance with the frequency of the signal "B" and predetermined constants indicative of the speed at which a pressure wave propergates through the fluid filling the chambers 28, 46 and conduit 40, and the length of the fluid path between the chambers 28, 46. The output of the delay circuit 60 (signal "C") is fed to a duty ratio determining circuit 62 which produces a square wave pulse train "D" which is then fed to the power amplifier 56 which subsequently outputs an energizing signal "E" to the solenoid 48. Each of the circuits 54, 56 just disclosed are operatively connected to a power source 64 as shown.

Figure 5:
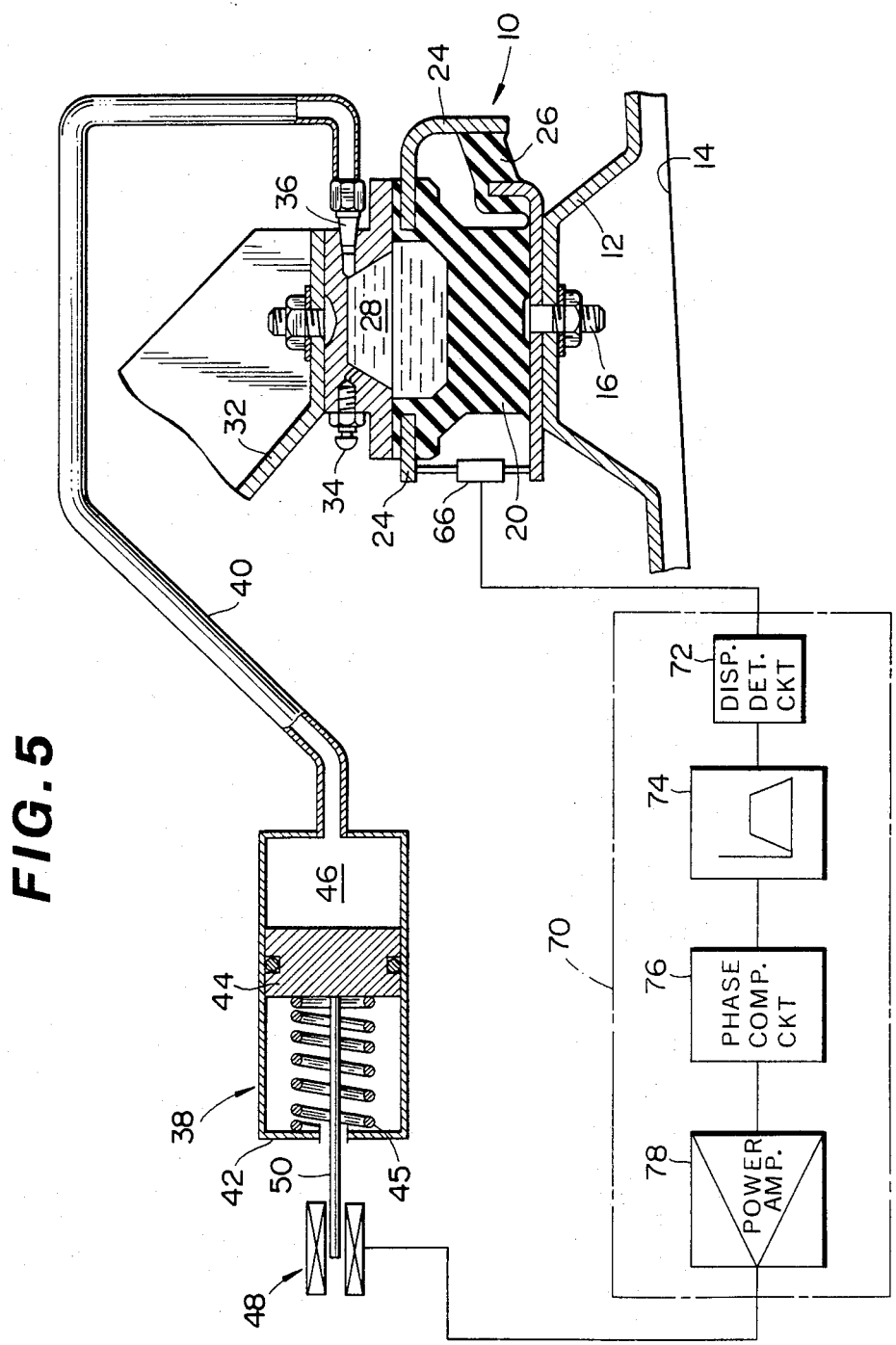
FIG. 5 is a sectional view of a second embodiment of the present invention.

FIG. 5 shows a second embodiment of the present invention. In this arrangement, a suitable sensor 66 is interposed between the base mounting bracket 18 and the retaining bracket 24 and adapted to output a signal indicative of one or both of the compression and expansion of the chamber 28. This sensor may take the form of a piezoelectric type strain gauge or the like. The output of the sensor 66 in this embodiment is fed to a control circuit generally denoted by 70. This circuit includes a displacement detection circuit 72, the output of which is fed to a band pass filter 74 which in this instance is set to screen out frequencies other than 10-200 Hz. The output of the band pass filter 74 is fed to a phase compensation circuit 76 which is essentially the same as that disclosed in connection with elements 58, 60 and 62 of FIG. 3 and which similarly functions to dely the signal inputted thereto from the band pass filter 74 in response to the frequency of said signal and produce a square wave pulse train of the nature produced by duty ratio determining circuit of FIG. 3 (viz., a signal similar to signal "D" shown in FIG. 4). This circuit further includes a power amplifier 78 which produces a solenoid energizing signal.

Figure 6:
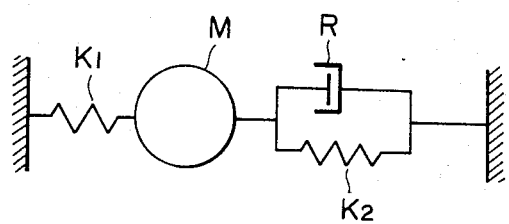
FIG. 6 is a schematic representation of the hydraulic circuits of the first and second embodiments.
Figure 7:
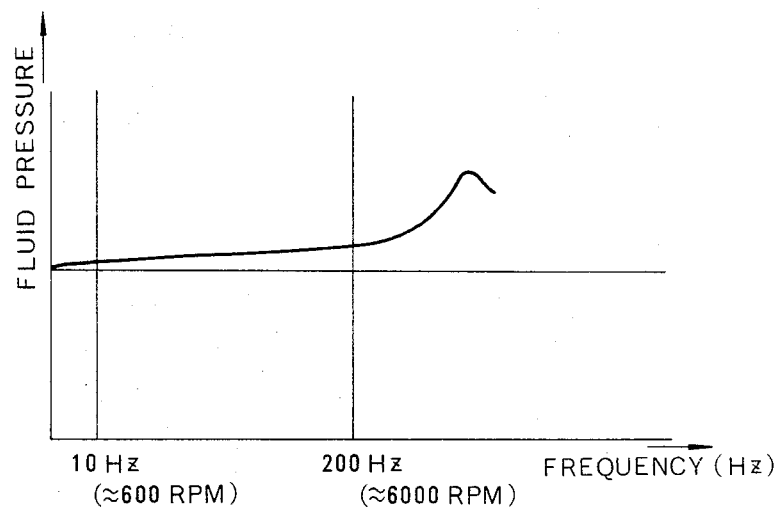
FIG. 7 is a graph showing in terms of fluid pressure and frequency, the pressure developed within the chambers and interconnecting conduiting with the change in energization frequency of the actuator of the first and second embodiments.

FIG. 6 is a schematic representation of the first and second embodiments disclosed hereinbefore. In this figure, M represents the mass of the fluid retained in the chambers and the conduit plus the mass of the piston 44, $K_1$ denotes a spring modulus representative of the resilience of the working fluid, $K_2$ the spring modulus of the spring 45, and R represents the flow resistance of the conduit 40.

Now, as will be readily appreciated, such a system will have a resonance frequency which is dependent on the above mentioned variables. Thus, in the disclosed embodiments by changing the diameter or length of the conduit interconnecting the actuator and the insulator, both of M and R will change and hence the resonance frequency. Further, as it is preferred to adapt the disclosed embodiments to provide the maximum vibration damping effect over an engine rotational speed (RPM) range of 10 Hz (approx. 600 RPM) to 200 Hz (approximately 6000 RPM), it is preferred to "tune" the systems so that they have a resonance frequency which falls outside the just mentioned range and in the range of 200-300 Hz which occurs only when the engine is operated at very high engine speeds (for example in the vicinity of 7000 RPM). With this arrangement the pressure produced by the actuator 38 is maintained relatively constant over the aforementioned range of 10 to 200 Hz. Of course the level of the pressure produced by the actuator may be readily varied by varying the electrical power outputted by the power amplifiers 56,78 to the respective solenoids.

Figure 8:
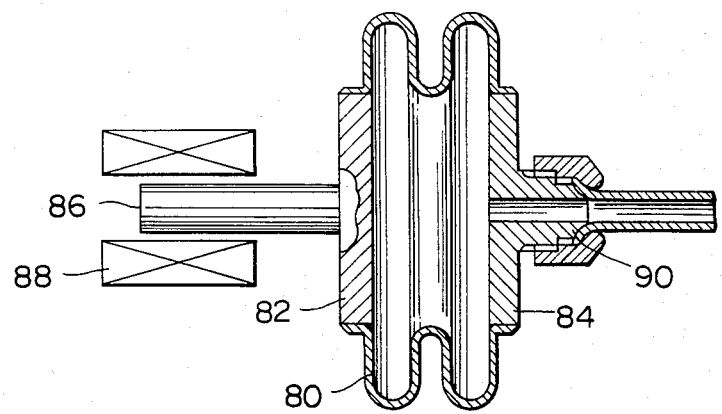
FIGS. 8 and 9 show possible variations in actuator design which may be employed in the embodiments of the present invention.
Figure 9:
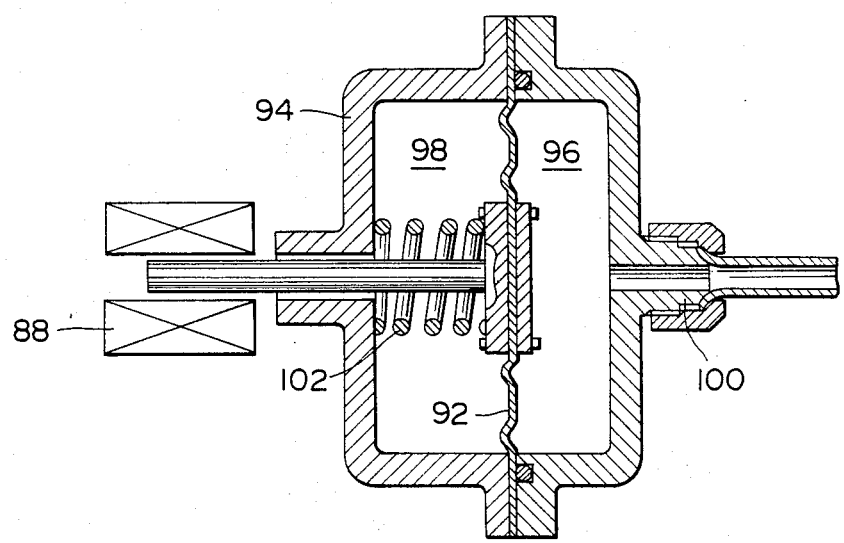

FIGS. 8 and 9 show possible actuator constructions which may be used in place of the cylinder/piston arrangement previously described. The arrangement shown in FIG. 8 comprises a metallic bellows 80 sealingly connected at the ends thereof to cylindrical end members 82 and 84. The end member 82 is provided with a shaft 86 which extends into the coil 88 of the solenoid as shown, while the end member 82 is formed with a connection nipple 99 to which the conduit 40 may be secured. It will be noted that this arrangement does not require a separate spring, this being inherently provided by the metallic bellows.

In the arrangement of FIG. 9 the actuator comprises a diaphragm 92 which divides a casing 94 into a pressure chamber 96 and an atmospheric chamber 98. The casing 94 is formed with a connection nipple 100 to which the conduit 40 may be secured as shown. In this arrangement a spring 102 is disposed in the atmospheric chamber.

Both of the above described actuator arrangements exhibit excellent sealing and durability and thus are highly suited for use in the somewhat hostile environment of an internal combustion engine compartment.

It will be further appreciated that the electric motor disclosed in connection with the first and second embodiments (viz., the solenoid) may be replaced with any other suitable arrangement such as rotatable type motor which drives either a cam or a crank if deemed advantageous.

The operation of the embodiments described hereinbefore is such that as the engine vibration produced by the reciprocation of the pistons and the like of the engine (generally referred to as "secondary" vibration) increases and the wave length of the pressure wave being transmitted back and forth between the chambers of the actuator 38 and the insulator 10 reduces, the delay circuits function to, as the engine approaches the chassis, delay the energization of the solenoids in a manner that the pressure wave generated at the insulator 10 has sufficient time to pass from the variable volume chamber 28 defined therein to the actuator and enter same just as the volume of the chamber 46 therein is increased. Further, as the energization of the soleoid is terminated earlier than normal, the pressurization of the fluid in the chamber 46 under the influence of the springs 45 produces a pressure wave which arrives in the insulator chamber 28 in time to maintain the pressure therein essentially constant despite the movement of the engine away from the chassis and the subsequent expansion of the chamber 28.

It will be also appreciated that a "micro computer" may be advantageously used to control the delaying of the solenoid energization via the use of look-up tables which take into account not only frequency but temperature as well. This is particularly so when a micro computer is used to control the ignition timing etc., of the engine to which the present invention is applied.

What is claimed is:

1. An arrangement for mounting an engine on a chassis comprising:
    an insulator operatively interposed between said engine and said chassis for supporting said engine on said chassis;
    means defining a first variable volume chamber in said insulator;
    means defining a second variable volume chamber which fluidly communicates with said first variable volume chamber;
    a solenoid operatively connected with said second variable volume defining means for varying the volume of said second variable volume chamber when energized;
    a sensor for sensing engine rotational speed and generating a signal indicative thereof; and
    a control circuit responsive to the output of said sensor for energizing said solenoid, said control circuit including:
    a wave shaping circuit which shapes the signal inputted from said sensor;
    a delay circuit which delays the signal inputted thereto from said wave shaping circuit by an amount which varies in accordance with the frequency of said signal;
    a duty ratio setting circuit which receives the output from said delay circuit and which produces a pulse train; and
    a power amplifier which amplifies said pulse train to a level suitable for energizing said solenoid, and applies said pulse train to said solenoid.

2. An arrangement as claimed in claim 1, wherein said second variable volume defining means takes the form of a cylinder in which a piston is reciprocatively disposed.

3. An arrangement as claimed in claim 2, wherein said piston is biased in a predetermined direction by a spring.

4. An arrangement as claimed in claim 1, further comprising a band pass filter which screens out all frequencies other than a predetermined range, said band pass filter being interposed between said signal producing means and said delay circuit.

5. An arrangement as claimed in claim 1, wherein said second variable volume defining means takes the form of a metallic bellows sealed at both ends, one end of said bellows being attached to a stationary member and the other end operatively connected to said solenoid.

6. An arrangement as claimed in claim 1, wherein said second variable volume chamber defining means takes the form of a casing divided by a diaphragm, said diaphragm being operatively connected to said solenoid.

7. An arrangement as claimed in claim 1, wherein said engine rotational speed sensor is one of an ignition distributor of said engine and a crank angle sensor operatively mounted on said engine.

8. An arrangement for mounting an engine on a chassis comprising:
    an insulator;
    means defining a first variable volume chamber in said insulator;
    said insulator being operatively interposed between said engine and said chassis for supporting said engine on said chassis in a manner which tends to change the volume of said first variable volume chamber;
    means defining a second variable volume chamber which fluidly communicates with said first variable volume chamber;
    a solenoid operatively connected with said second variable volume defining means for varying the volume of said second variable volume chamber when energized;
    means for sensing a change of distance between said engine and said chassis, said sensor taking the form of a strain gauge operatively interconnected between said engine and said chassis for generating a signal indicative of said engine being displaced with respect to said chassis;
    a control circuit responsive to the output of said strain gauge for energizing said solenoid, said control circuit including:
    a wave shaping circuit which shapes the signal inputted from said strain gauge;
    a delay circuit which delays the signal inputted thereto from said wave shaping circuit by an amount which varies in accordance with the frequency of said signals;
    a duty ratio setting circuit which receives the output from said delay circuit and which produces a pulse train; and a power amplifier which amplifies said pulse train to a level suitable for energizing said solenoid, and applies said pulse train to said solenoid.

9. An arrangement as claimed in claim 8, wherein said second variable volume defining means takes the form of a cylinder in which a piston is reciprocatively disposed.

10. An arrangement as claimed in claim 9, wherein said piston is biased in a predetermined direction by a spring.

11. An arrangement as claimed in claim 8, further comprising a band pass filter which screens out all frequencies other than a predetermined range, said band pass filter being interposed between said signal producing means and said delay circuit.

12. An arrangement as claimed in claim 8, wherein said second variable volume defining means takes the form of a metallic bellows sealed at both ends, one end of said bellows being attached to a stationary member and the other end operatively connected to said solenoid.

13. An arrangement as claimed in claim 8, wherein said second variable volume chamber defining means takes the form of a casing divided by a diaphragm, said diaphragm being operatively connected to said solenoid.

* * * * *